(12) United States Patent
Bian et al.

(10) Patent No.: US 11,722,373 B2
(45) Date of Patent: Aug. 8, 2023

(54) METHOD FOR NETWORKING MULTI-PROTOCOL TERMINALS, METHOD FOR COMMUNICATING, STORAGE MEDIUM, AND ELECTRONIC DEVICE

(71) Applicant: BOE Technology Group Co., Ltd., Beijing (CN)

(72) Inventors: Yi Bian, Beijing (CN); Jun Yang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/685,660

(22) Filed: Mar. 3, 2022

(65) Prior Publication Data

US 2022/0321412 A1 Oct. 6, 2022

(30) Foreign Application Priority Data

Mar. 31, 2021 (CN) .......................... 202110349862.5

(51) Int. Cl.
*H04L 41/084* (2022.01)
*H04L 41/40* (2022.01)
*H04L 69/08* (2022.01)

(52) U.S. Cl.
CPC .......... *H04L 41/0846* (2013.01); *H04L 41/40* (2022.05); *H04L 69/08* (2013.01)

(58) Field of Classification Search
CPC ...... H04L 41/0846; H04L 41/40; H04L 69/08
See application file for complete search history.

(56) References Cited

U.S. PATENT DOCUMENTS

2020/0236546 A1* 7/2020 Yu .............................. G06F 8/65

FOREIGN PATENT DOCUMENTS

| CN | 103716308 A | | 4/2014 | |
|----|-------------|---|--------|---|
| CN | 103888443 A | | 6/2014 | |
| CN | 106792800 B | | 5/2017 | |
| CN | 110493351 A | * | 11/2019 | ............. H04L 61/20 |
| CN | 111416845 A | * | 7/2020 | |

\* cited by examiner

*Primary Examiner* — Christopher B Robinson
(74) *Attorney, Agent, or Firm* — IPro, PLLC (57) ABSTRACT

The present disclosure provides a method for networking multi-protocol terminals, a method for communicating, a storage medium, and an electronic device. The method for networking multi-protocol terminals includes: acquiring a configuration file, configuring, based on the configuration file, a virtual management terminal, wherein the virtual management terminal is configured to perform conversion between an entity terminal protocol and a predetermined protocol; receiving a network access request from a first entity terminal, and creating, based on the network access request, a first virtual terminal corresponding to the first entity terminal, wherein the first virtual terminal is configured to perform conversion between a server protocol and the predetermined protocol; and implementing, based on the first virtual terminal, network access of the first entity terminal.

16 Claims, 5 Drawing Sheets

METHOD FOR NETWORKING MULTI-PROTOCOL TERMINALS, METHOD FOR COMMUNICATING, STORAGE MEDIUM, AND ELECTRONIC DEVICE

CROSS-REFERENCE TO RELATED APPLICATION

The present disclosure claims priority to Chinese Patent Application No. 202110349862.5, filed on Mar. 31, 2021 and entitled "METHOD FOR NETWORKING MULTI-PROTOCOL TERMINAL, METHOD FOR COMMUNICATION, STORAGE MEDIUM, AND ELECTRONIC DEVICE," the entire content of which is incorporated herein by reference.

TECHNICAL FIELD

The present disclosure relates to the field of Internet of Things (IoT) technologies, and in particular relates to a method for networking multi-protocol terminals, a method for communication in multi-protocol networks, a storage medium, and an electronic device.

BACKGROUND

With developments of the IoT technologies, more and more terminal devices need to access the network. In an IoT network, a plurality of terminals under different communication protocols are used, and in most cases, it is necessary to achieve collaborative networking among the terminals to achieve corresponding functions. However, due to incompatibility of the communication protocols among the terminals, an intermediate conversion device is usually required in a converged network to implement protocol conversion among the various terminals. In order to meet communication requirements, the intermediate conversion device needs to be compatible with different protocols, the structure of the intermediate conversion device is often complex, which affects actual networking effects and causes an increase in production cost.

SUMMARY

Objects of embodiments of the present disclosure are to provide a method for networking multi-protocol terminals, a method for communication in multi-protocol networks, and a storage medium and an electronic device thereof to solve the problem of complex structure and high production cost of an intermediate conversion device caused by the terminals under different communication protocols in the IoT in the related art and the need for protocol compatibility of intermediate conversion device.

According to one aspect of the embodiments of the present disclosure, a method for networking multi-protocol terminals is provided. The method includes: acquiring a configuration file; configuring, based on the configuration file, a virtual management terminal, wherein the virtual management terminal is configured to perform conversion between an entity terminal protocol and a predetermined protocol; receiving a network access request from a first entity terminal, and creating, based on the network access request, a first virtual terminal corresponding to the first entity terminal, wherein the first virtual terminal is configured to perform conversion between a server protocol and the predetermined protocol; and implementing, based on the first virtual terminal, network access of the first entity terminal.

The configuration file may be acquired by receiving the configuration file delivered by a server.

In some embodiments, the configuration file at least includes: an entity terminal list, wherein the entity terminal list at least includes entity terminal types; virtual terminal types and a cache configuration of a virtual terminal corresponding to each of the virtual terminal types; and a correspondence list between virtual terminals and entity terminals.

In some embodiments, configuring, based on the configuration file, the virtual management terminal includes: configuring, based on the entity terminal list, a communication interface on the virtual management terminal for each of the entity terminals in the entity terminal list.

In some embodiments, receiving the network access request from the first entity terminal and creating, based on the network access request, the first virtual terminal corresponding to the first entity terminal includes: detecting whether the first entity terminal is present in the entity terminal list; determining, in response to the first entity terminal being present in the entity terminal list, a virtual terminal type of the first virtual terminal based on the type of the first entity terminal; and creating, based on the virtual terminal type and the correspondence list between the virtual terminals and the entity terminals, the first virtual terminal and dividing a cache corresponding to the type of the first virtual terminal for the first virtual terminal.

In some embodiments, receiving the network access request from the first entity terminal; and creating, based on the network access request, the first virtual terminal corresponding to the first entity terminal further includes: feeding, in response to the first entity terminal being not present in the entity terminal list, failure information back to the first entity terminal.

In some embodiments, implementing, based on the first virtual terminal, the network access of the first entity terminal includes: caching terminal status information of the first entity terminal in the cache of the first virtual terminal, wherein the terminal status information is determined based on the network access request; and reporting an identifier of the first virtual terminal, the virtual terminal type of the first virtual terminal, and the terminal status information of the first entity terminal to a server over an uplink network, so as to complete the network access of the first entity terminal.

In some embodiments, the method further includes: acquiring an updated configuration file; configuring, based on the updated configuration file, the virtual management terminal; and creating, based on a network access application of an entity terminal, a virtual terminal corresponding to the entity terminal, and implementing, based on the virtual terminal, network access of the entity terminal.

According to another aspect of the embodiments of the present disclosure, a method for communication in multi-protocol networks is provided. The method includes: receiving an identifier of a target virtual terminal and a target data packet delivered by a server; converting, by a target virtual terminal corresponding to the identifier of the target virtual terminal, the target data packet into first delivered data of a predetermined protocol; converting, by a virtual management terminal, the first delivered data into second delivered data of a target protocol, wherein the target protocol is a protocol of a target entity terminal corresponding to the target virtual terminal; and sending, by the virtual management terminal, the second delivered data to the target entity terminal over a downlink network.

In some embodiments, the method further includes: caching, upon converting the target data packet into the first delivered data by the target virtual terminal, the first delivered data in a cache of the target virtual terminal by the target virtual terminal; and acquiring, prior to converting the first delivered data into the second delivered data by the virtual management terminal, the first delivered data from the cache of the target virtual terminal by the virtual management terminal.

In some embodiments, the method further includes: acquiring first reported data of a second entity terminal; converting, by the virtual management terminal, the first reported data into second reported data of the predetermined protocol, and sending the second reported data to a second virtual terminal corresponding to the second entity terminal; and receiving the second reported data by the second virtual terminal, converting the second reported data into third reported data of a server protocol, and reporting the third reported data to the server.

According to another aspect of the embodiments of the present disclosure, a non-transitory computer storage medium storing a computer program therein is provided. The computer program, when run by a processor, causes the processor to perform the methods as described above.

According to another aspect of the embodiments of the present disclosure, an electronic device at least including a memory and a processor is provided The memory stories a computer program, and the processor, when running the computer program on the memory, is caused to perform the methods as described above.

DETAILED DESCRIPTION

Various solutions and features of the present disclosure are described herein with reference to the accompanying drawings.

It should be understood that various modifications can be made to the embodiments applied here. Therefore, the above description should not be regarded as a limitation, but merely as examples of the embodiments. Those skilled in the art may envisage other modifications within the scope and spirit of the present disclosure.

The drawings included in the description and constituting a part of the description illustrate the embodiments of the present disclosure, and are configured to explain principles of the present disclosure in conjunction with general descriptions of the present disclosure given above and detailed descriptions of the embodiments given below.

These and other features of the present disclosure become apparent based on the following descriptions of exemplary forms of the embodiments given as non-limiting examples with reference to the accompanying drawings.

It should also be understood that although the present disclosure has been described with reference to some exemplary examples, those skilled in the art can implement many other equivalent forms of the present disclosure, which have the features as claimed and are thus fall within the defined scope of protection.

The above and other aspects, features and advantages of the present disclosure become more apparent in view of the following detailed descriptions in combination with the accompanying drawings.

Exemplary embodiments of the present disclosure are described hereinafter with reference to the accompanying drawings. However, it should be understood that the described embodiments are merely examples of the present disclosure, which can be implemented in various ways. Well-known and/or repeated functions and structures have not been described in detail to avoid unnecessary or redundant details from obscuring the present disclosure. Therefore, the exemplary structural and functional details applied herein are not intended to be limiting, but merely serve as the basis of the claims and representative basis for teaching those skilled in the art to use the present disclosure in a variety of ways with substantially any suitable detailed structure.

The description may use the phrase "in one embodiment," "in another embodiment," "in still another embodiment" or "in other embodiments," all of which can refer to one or more of the same or different embodiments according to the present disclosure.

Figure 1:
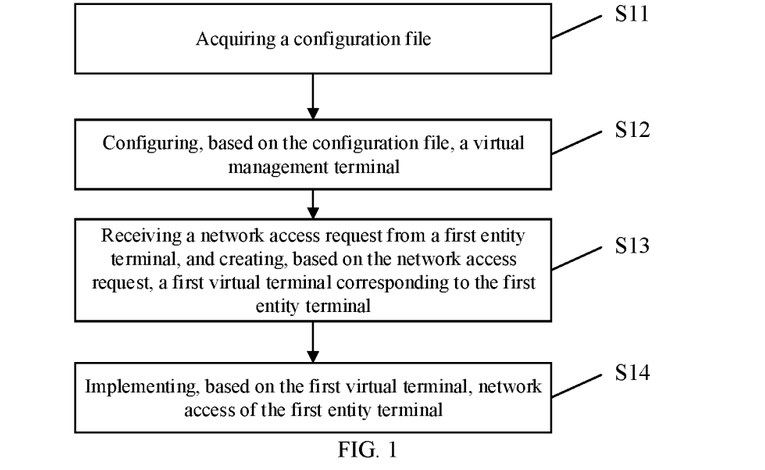
FIG. 1 is a flowchart of a method for networking multi-protocol terminals in a first embodiment of the present disclosure.

In order to solve the problem of large difficulty and low efficiency of networking multi-protocol terminals caused by the complex structure of an intermediate conversion device in the IoT for multi-protocol terminals in the related art, a first embodiment of the present disclosure provides a method for multi-protocol networking terminals, the method is mainly applied to the intermediate conversion device of an IoT architecture. The flowchart is as shown in FIG. 1, and the method mainly includes the following processes.

In S11, a configuration file is acquired.

In a possible implementation, the configuration file may be acquired from other devices, for example, from a server, that is, the configuration file delivered by the server is received.

The server is generally an Internet device which uses the Transmission Control Protocol/Internet Protocol (TCP/IP) for communication and transmission. Each entity terminal attempting to access the network actually needs to be connected to the server for the purposes of data communication, instruction interaction, functional collaboration and the like among the terminals. The intermediate conversion device is usually a gateway, with the upstream of the gateway connected to the server and the downstream of the gateway connected to the entity terminal to implement the data transfer between the server and the entity terminal.

In the embodiment of the present disclosure, the IoT where the server and the entity terminal are located mainly refers to a large-scale IoT for enterprise-level use, which requires data interaction and functional collaboration among various devices, such as employee attendance management based on an access control device and a monitoring device, or sensing environmental information by various sensors, and then adjusting an office environment in combination with an air conditioner, an air purifier, a humidifier and other devices. For the enterprise-level IoT, network access-related information, such as a demand situation and a deployment situation of each entity terminal, usually has fixed requirements. Therefore, in order to simplify the network access operation and achieve rapid configuration, networking operators usually send the corresponding configuration file to each intermediate conversion device by the server, such that the intermediate conversion device can implement rapid internal architecture settings based on the configuration file, which reduces networking difficulty and improves networking efficiency.

In another possible implementation, the configuration file may be acquired locally, which is not repeated here.

In some embodiments, the configuration file mainly includes: (1) an entity terminal list, that is, a list of entity terminals allowed to access the network, wherein the list at least includes the entity terminal types allowed to access the network, and communication requirements for different entity terminal types are all different; (2) virtual terminal types, wherein the purpose of setting the virtual terminal is to simulate performances of the entity terminals in the intermediate conversion device, for the server, the virtual terminal is an entity which can be directly accessed and operated, such that the virtual terminal types need to correspond to the entity terminal types, and different virtual terminal types need to implement configurations of different caches; (3) a correspondence relationship between the virtual terminals and the entity terminals, which is usually expressed in the form of a list.

In S12, a virtual management terminal is configured based on the configuration file.

In the embodiment of the present disclosure, neither the virtual management terminal nor the virtual terminal is an entity device, but a virtual device implemented by a software program in the intermediate device.

Figure 2:
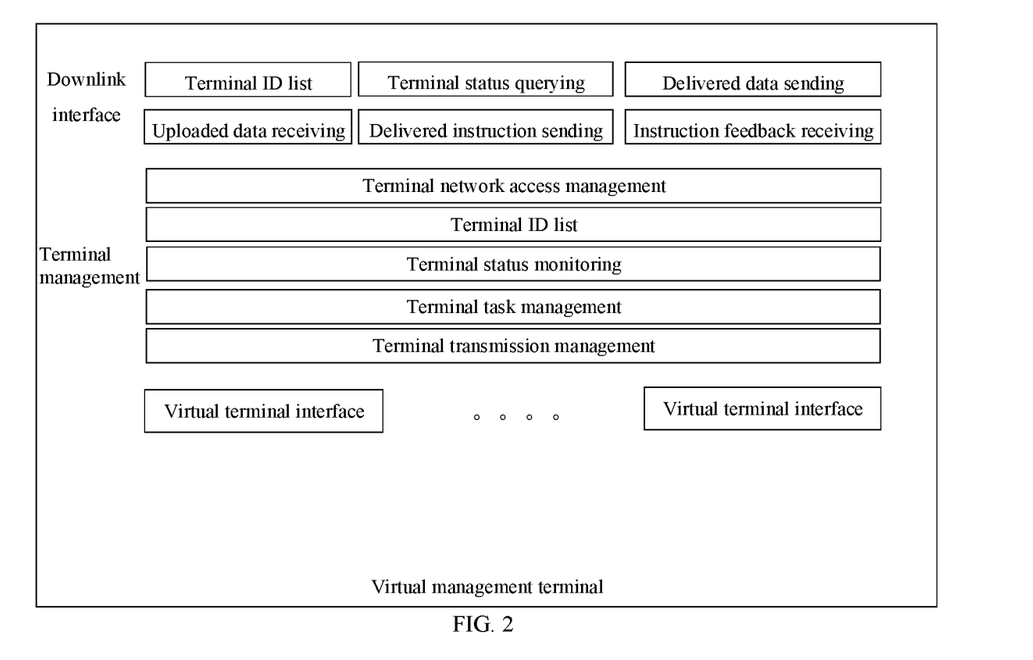
FIG. 2 is a schematic diagram of the architecture of a virtual management terminal in the first embodiment of the present disclosure.

The virtual management terminal mainly manages all entity terminals in a downlink network, and synchronizes statuses, tasks, data and the like of the entity terminals to all virtual terminals over a virtual terminal interface. The schematic diagram of an architecture of the virtual management terminal is as shown in FIG. 2. The virtual management terminal acquires information corresponding to the entity terminals (such as a terminal identifier (ID) and terminal status) over a downlink interface, implements management configuration of the entity terminals by each terminal management function module, and is connected to each virtual terminal over the virtual terminal interface. In practice, the virtual management terminal is also configured to implement convert operation between an entity terminal protocol and a predetermined protocol. The predetermined protocol is an internal communication protocol of the intermediate conversion device. The networking operators may set a protocol principle of the predetermined protocol themselves. The virtual management terminal parses, based on a parsing fashion of the corresponding protocol provided by each entity terminal manufacturer, a data packet transmitted by each of different entity terminals to acquire actual transmitted content, and express the content of the predetermined protocol, so as to achieve the consistency of the entity terminal protocols in the intermediate conversion device. It should be understood that the protocol of the entity terminal may be a Bluetooth transmission protocol, an infrared transmission protocol, or any other communication protocol of an IoT device, which is not limited in the embodiment of the present disclosure.

In some embodiments, in response to receiving the configuration file, the intermediate conversion device configures corresponding communication interfaces on the virtual management terminal for each entity terminal in the list based on the entity terminal list contained therein, so as to facilitate information acquisition and data delivery of the virtual management terminal for the entity terminal, such as "delivered data sending," "uploaded data receiving," "delivered instruction sending" and "instruction feedback receiving" as shown in FIG. 2.

In S13, a network access request from a first entity terminal is received, and a first virtual terminal corresponding to the first entity terminal is created based on the network access request.

The first entity terminal is an entity terminal which has not joined the IoT yet. In response to being connected to the virtual management terminal, the first entity terminal initiates the network access request to the virtual management terminal, and the network access request at least includes the content such as an ID, a physical address, an entity terminal type and request time of the first entity terminal. In response to receiving the network access request, the intermediate conversion device creates the first virtual terminal corresponding to the first entity terminal, and simulates all functions and characteristics of the first entity terminal by the first virtual terminal, such that the first virtual terminal is an entity that can be directly accessed for the server.

The virtual terminal is also configured to implement the conversion between the predetermined protocol and a protocol of the server. In combination with the convert operation between the predetermined protocol and the protocol of the entity terminal implemented by the virtual management terminal, finally, the information reported by the entity terminal can be known correctly by the server, and the content fed back or delivered by the server can also be directly acquired by the entity terminal. For the server, all accessible entities accessed by the server are entities of the same protocol. For the entity terminals, all the contents delivered by the IoT are also the contents expressed by each of the entity terminals under its own protocols.

Figure 3:
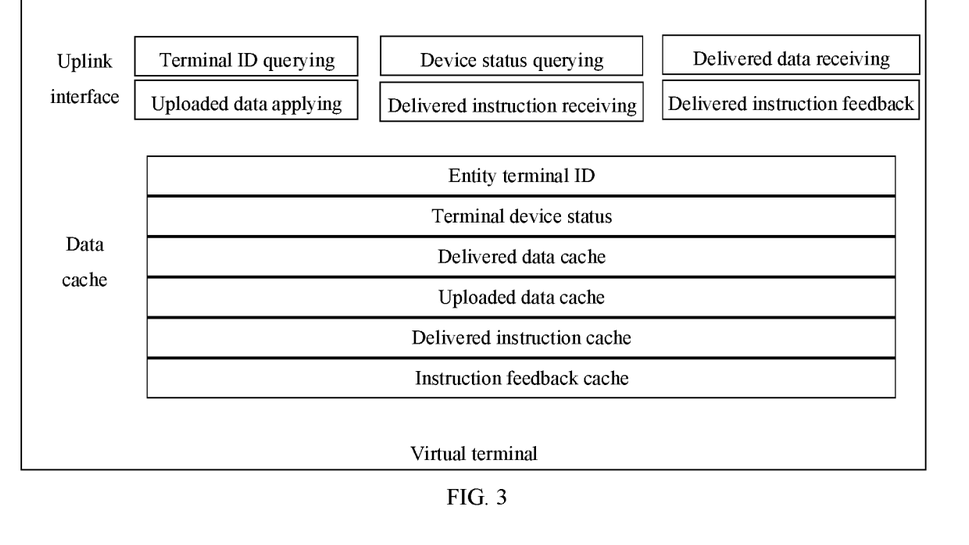
FIG. 3 is a schematic diagram of the architecture of a virtual terminal in the first embodiment of the present disclosure.

FIG. 3 shows a schematic diagram of an architecture of the virtual terminal. An uplink interface of the virtual terminal is configured to communicate with the server to report or receive corresponding data or instructions. A data cache of the virtual terminal is configured to cache content of the entity terminal corresponding to the virtual terminal, such as the ID of the entity terminal, device status information of the terminal, and content cache of the communication between the entity terminal and the server. In the case that a virtual terminal is correspondingly created, taking network access of the first entity terminal as an example, firstly, whether the currently accessed first entity terminal is a device allowed to access is detected, that is, whether the first entity terminal is present in the entity terminal list delivered in the configuration file is detected, for example, whether the ID or physical address of the first entity terminal is present in the list is detected. In response to detecting that the ID or physical address of the first entity terminal is present in the list, the first entity terminal is proved to be a device pre-configured and allowed to access the IoT; and otherwise, it indicates that the first entity device does not have a network access permission, and is not allowed to continue communication with the intermediate conversion device, and network access failure information is fed back to the first entity device. In the case that the first entity terminal is present in the entity terminal list, based on the entity terminal type of the first entity terminal, it is determined that the virtual terminal type of the first virtual terminal to be created is the same as the entity terminal type of the first entity terminal. Subsequently, the first virtual terminal is created based on the virtual terminal type and a correspondence list between the virtual terminal and the entity terminal, and the cache of a corresponding type is divided for the first virtual terminal based on the virtual terminal type to cache entity terminal information and transmission information. It should be noted that different entity terminal types or virtual terminal types actually affect the size, quantity, and timeliness of the transmitted data packet and a size of the cache, but do not affect the actually transmitted content.

In S14, network access of the first entity terminal is implemented based on the first virtual terminal.

In the case that the first virtual terminal is created, terminal status information of the first entity terminal contained in the network access request is acquired based on the network access request from the first entity terminal and stored in the corresponding cache, such as the ID, physical address, device status and other contents of the first entity terminal. Then, the ID of the first virtual terminal and the virtual terminal type of the first virtual terminal which are generated upon the creation of the first virtual terminal, as well as the acquired terminal status information of the first entity terminal are reported to the server over the uplink network to complete network access of the first entity terminal. For the server, the first virtual terminal accessed to the network has all the functions and characteristics of the first entity terminal is, and the data received and sent by the server is packaged and transmitted according to requirements corresponding to the virtual terminal type of the first virtual terminal.

In the embodiment of the present disclosure, the virtual terminal is designed to simulate the entity terminal in the intermediate conversion device to implement conversion between the server protocol and the predetermined internal protocol. By the virtual management terminal, the entity terminal is managed and controlled. By a parsing mechanism disclosed by the entity terminal manufacturer, the parsing of the entity terminal protocol is achieved to further complete the conversion between the predetermined internal protocol and the entity terminal protocol. In this way, it is convenient to for the entity terminals under different protocols to directly access the network, the structure of the intermediate conversion device is simplified, rapid networking of the multi-protocol terminals is achieved, the networking speed and effect are improved, and a production cost of the intermediate conversion device is reduced.

Figure 4:
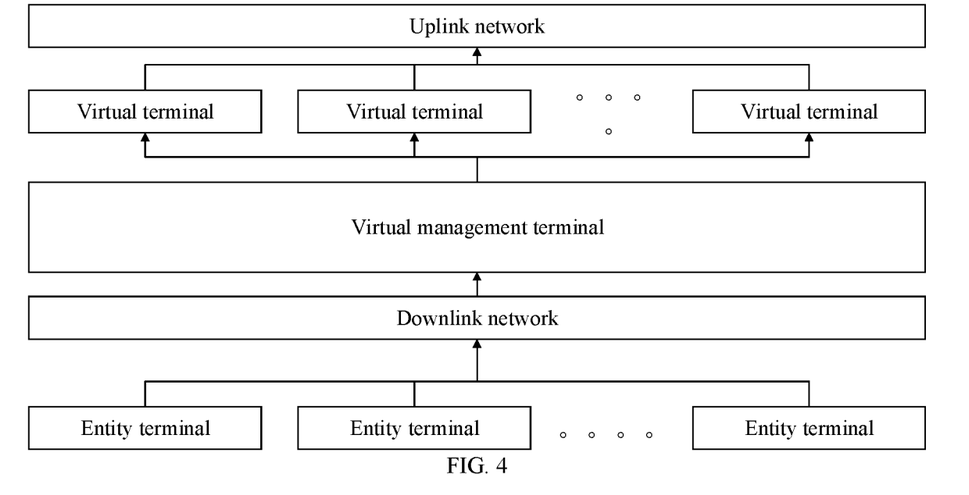
FIG. 4 is a schematic diagram of mapping between the virtual management terminal and the virtual terminal in the first embodiment of the present disclosure.

FIG. 4 is a schematic diagram of mapping between the virtual management terminal and the virtual terminal in the intermediate conversion device. As shown in FIG. 4, one virtual management terminal may be connected to and manage a plurality of entity terminals over a downlink network, that is, correspondingly connected to a plurality of virtual terminals, and each virtual terminal only corresponds to one entity terminal to implement the functions and characteristic of the corresponding entity terminal, and communicates with the server over an uplink network.

Figure 5:
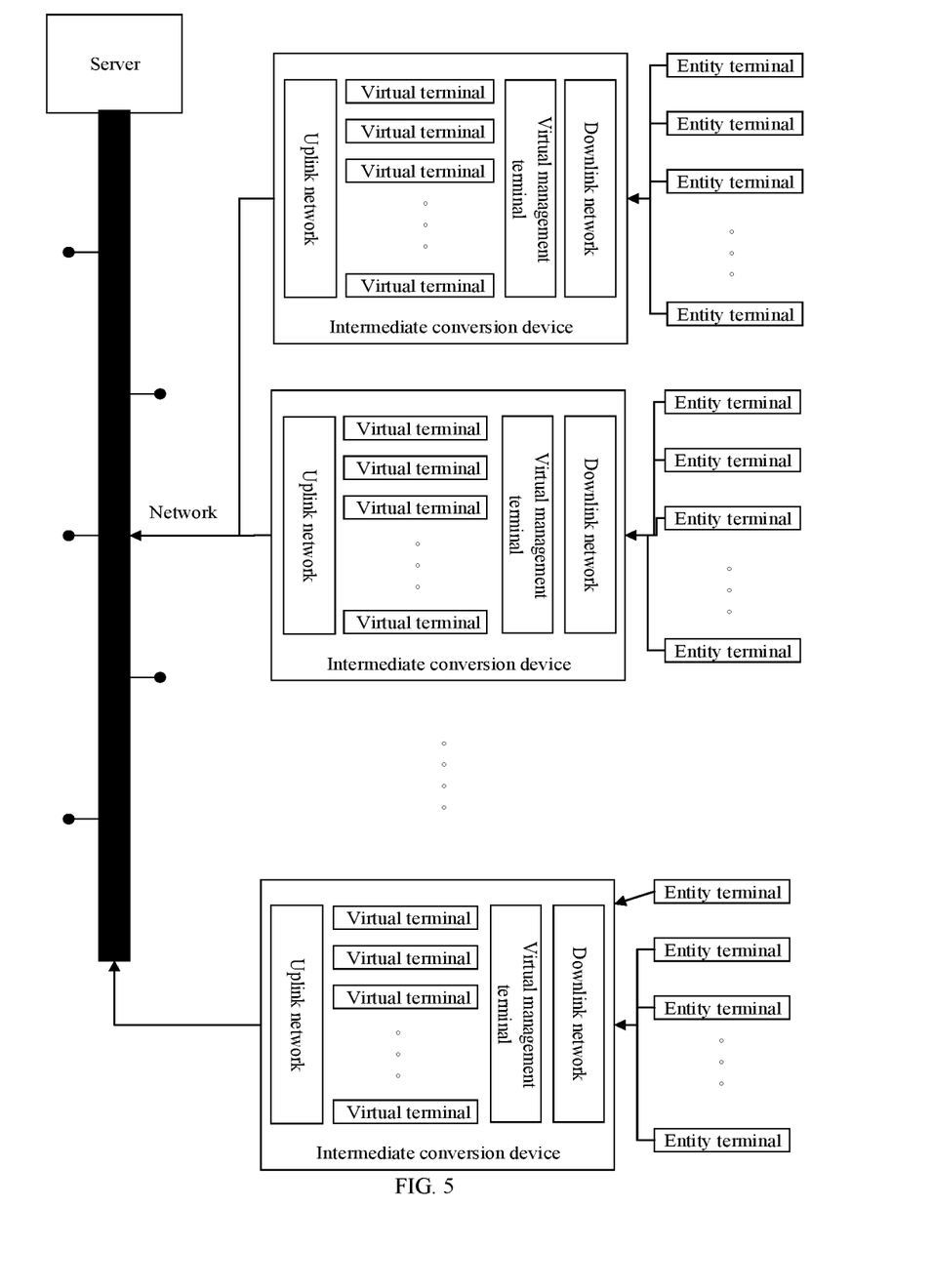
FIG. 5 is a schematic diagram of the architecture of an IoT network in the first embodiment of the present disclosure.

FIG. 5 shows a schematic diagram of the architecture of an IoT network. As shown in FIG. 4, a plurality of intermediate conversion devices are connected to the server, each intermediate conversion device is connected to a plurality of entity terminals simultaneously, and based on the settings of the virtual management terminal and the virtual terminal in each intermediate conversion device, the rapid networking between the multi-protocol entity terminals and the server is achieved.

In the case that the entity terminal connected in the IoT needs to be expanded or adjusted, the networking operators may modify and re-deliver the configuration file to update the architecture in the intermediate conversion device, thereby implementing the access of a new entity terminal or adjustment of the original entity device. Exemplarily, the updated configuration file is delivered to the intermediate conversion device by the server, and the intermediate conversion device acquires the updated configuration file, re-configures the virtual management terminal based on the updated configuration file, such as adjusting the quantity of the downlink interfaces and correspondence between the interfaces and the entity terminals, then re-creates the corresponding virtual terminal based on a network access application of the entity terminal, and implements network access.

The method disclosed in the embodiment not only simplifies the structure of the intermediate conversion device and reduces the networking difficulty, but also simplifies the update and adjustment operations of the network, which facilitates the expansion of the IoT and implements the access of more types of entity terminal to achieve the effect of enriching the functions of the IoT.

Figure 6:
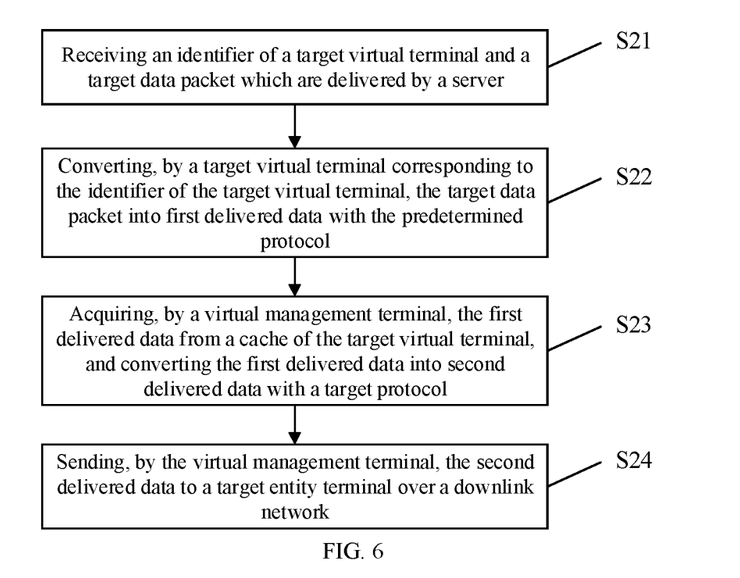
FIG. 6 is a flowchart of a method for communication in multi-protocol networks in a second embodiment of the present disclosure.

A second embodiment of the present disclosure provides a method for communication in multi-protocol networks based on the method for networking according to the first embodiment. The flowchart is as shown in FIG. 6 and mainly includes the following processes.

In S21, the identifier of a target virtual terminal and a target data packet delivered by the server are received.

For the server, because the virtual terminal is an entity capable of being directly accessed, the data packets delivered by the server are all data packets for the virtual terminal, and in the case that the target data package is delivered, the data is to be split and packaged based on a virtual terminal type of the target virtual terminal.

In S22, the target data packet is converted into first delivered data of the predetermined protocol by a target virtual terminal corresponding to the identifier of the target virtual terminal.

Upon S22, the method further includes caching the first delivered data in a cache of the target virtual terminal by the target virtual terminal.

In response to receiving the target data packet, the target virtual terminal corresponding to the identifier of the target virtual terminal converts the target data packet of the server protocol into the first delivered data of the predetermined protocol, and simultaneously caches the first delivered data in the cache to wait for subsequent processing by the virtual management terminal.

In S23, the first delivered data is converted into second delivered data of a target protocol by the virtual management terminal.

Prior to S23, the method further includes acquiring the first delivered data from the cache of the target virtual terminal by the virtual management terminal.

In S24, the second delivered data is sent to the target entity terminal by the downlink network by the virtual management terminal.

In response to caching the first delivered data in the cache, the target virtual terminal may notify the corresponding virtual management terminal to acquire the first delivered data. In response to receiving the notification, the virtual management terminal acquires the first delivered data from the corresponding cache and converts the first delivered data into the second delivered data of the target protocol of the target entity terminal. The target protocol is the format of a protocol of the target entity terminal corresponding to the target virtual terminal. Finally, the virtual management terminal sends the second delivered data to the target entity terminal over the downlink network to complete the process of delivering the data from the server to the entity terminal.

Figure 7:
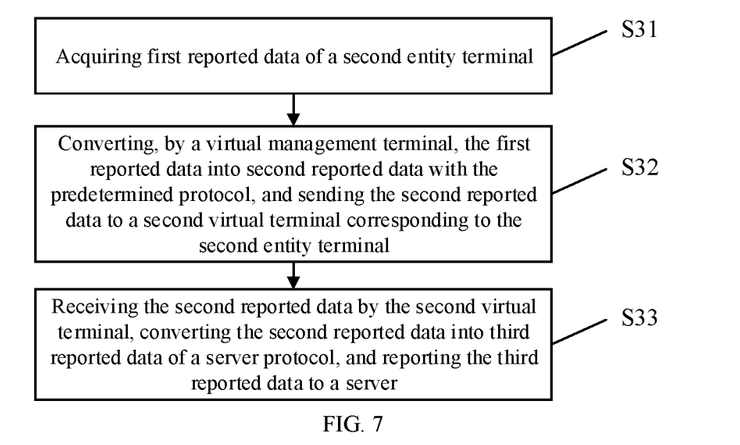
FIG. 7 is another flowchart of the method for communication in multi-protocol networks in the second embodiment of the present disclosure.

It should be understood that processes S21 to S24 give the process of data delivery, and in practical, the method should also include the process of data reporting by the entity terminal. FIG. 7 shows another implementation process of the method for communication in multi-protocol networks, which illustrates the process of data reporting by the entity terminal.

In S31, first reported data of a second entity terminal is acquired.

In S32, the first reported data is converted into second reported data of the predetermined protocol by the virtual management terminal, and the second reported data is sent to a second virtual terminal corresponding to the second entity terminal; and In S33, the second reported data is received by the second virtual terminal, the second reported data is converted into third reported data of the server protocol, and the third reported data is reported to the server.

Data reporting disclosed in the above processes corresponds to data delivery shown in FIG. 6, which actually implements the conversion between the predetermined protocol and the entity terminal protocol by the virtual management terminal, and the conversion between the predetermined protocol and the server protocol is achieved by the virtual terminal. The virtual management terminal and the virtual terminal are collaboratively operated to achieve communication of the multi-protocol entity terminals, which avoids mutual conversion among multiple protocols to be implemented by the intermediate conversion device, thereby simplifying the structural complexity of the intermediate conversion device, reducing the difficulty of data communication between the entity terminal and the server, and even among a plurality of entity terminals in the network, and optimizing the implementation of the functions of the IoT.

It should be noted that there is no fixed order of execution between the method for communicating shown in FIG. 6 and the method for communicating shown in FIG. 7. In fact, the server delivers the data based on the processes shown in FIG. 6 and then the entity terminal gives feedback based on the processes shown in FIG. 7, or the entity terminal reports the data based on the processes shown in FIG. 7 and then the server gives feedback based on the processes shown in FIG. 6, which is not limited in the embodiment of the present disclosure.

A third embodiment of the present disclosure provides a non-transitory computer storage medium, which may be installed in an intermediate conversion device of IoT. The non-transitory computer storage medium may be a computer-readable medium storing a computer program therein. The computer program, when run by a processor, causes the processor to perform the method according to the first embodiment of the present disclosure. The method includes processes S101 to S104 as follows.

In S101, a configuration file is acquired.

In S102, a virtual management terminal is configured based on the configuration file, wherein the virtual management terminal is configured to perform conversion between an entity terminal protocol and a predetermined protocol.

In S103, a network access request is received from a first entity terminal, and a first virtual terminal corresponding to the first entity terminal is created based on the network access request, wherein the first virtual terminal is configured to perform conversion between a server protocol and the predetermined protocol.

In S104, network access of the first entity terminal is implemented based on the first virtual terminal.

In some embodiments, the configuration file at least includes an entity terminal list, and the entity terminal list at least includes entity terminal types; virtual terminal types and a cache configuration of a virtual terminal corresponding to each virtual terminal type.

In response to configuring the virtual management terminal based on the configuration file, the computer program, when run by the processor, causes the processor to: configure a communication interface on the virtual management terminal for each of the entity terminals in the list based on the entity terminal list.

In response to receiving the network access request from the first entity terminal, and creating the first virtual terminal corresponding to the first entity terminal based on the network access request, the computer program, when run by the processor, causes the processor to: detect whether the first entity terminal is present in the entity terminal list; in response to the first entity terminal being present in the entity terminal list, determine a virtual terminal type of the first virtual terminal based on the type of the first entity terminal; and create the first virtual terminal based on the virtual terminal type, and divide a cache corresponding to the type of the first virtual terminal for the first virtual terminal.

In response to implementing the network access of the first entity terminal based on the first virtual terminal, the computer program, when run by the processor, causes the processor to: cache terminal status information of the first entity terminal in the cache of the first virtual terminal, wherein the terminal status information is determined based on the network access request, and report an identifier of the first virtual terminal, the virtual terminal type of the first virtual terminal, and the terminal status information of the first entity terminal to the server over an uplink network to complete the network access of the first entity terminal.

The computer program, when run by the processor, causes the processer to: receive an updated configuration file delivered by the server, configure the virtual management terminal based on the updated configuration file, create a virtual terminal corresponding to an entity terminal based on a network access application of the entity terminal, and implement network access of the entity terminal based on the virtual terminal.

In this embodiment, the virtual terminal is designed to simulate the entity terminal in the intermediate conversion device to implement conversion between the server protocol and the predetermined internal protocol. By the virtual management terminal, the entity terminal is managed and controlled. By a parsing mechanism disclosed by the entity terminal manufacturer, the entity terminal protocol is parsed to further complete the conversion between the predetermined internal protocol and the entity terminal protocol. In this way, it is convenient for the entity terminals under different protocols to directly access the network, the structure of the intermediate conversion device is simplified, and the multi-protocol terminals are quickly networked, thereby improving the networking speed and effect and reducing the production cost of the intermediate conversion device.

Meanwhile, the computer program, when run by the processor, also causes the processor to perform the method according to the second embodiment of the present disclosure, which includes the processes S201 to S204 as follows.

In S201, an identifier of a target virtual terminal and a target data packet delivered by the server are received.

In S202, the target data packet is converted into first delivered data of a predetermined protocol by the target virtual terminal corresponding to the identifier of the target virtual terminal, and caching the first delivered data in a cache of the target virtual terminal;

In S203, the first delivered data is acquired from the cache of the target virtual terminal by the virtual management terminal, and converting the first delivered data into second delivered data with a target protocol, wherein the target protocol is a protocol of the target entity terminal corresponding to the target virtual terminal; and In S204, the second delivered data is sent to the target entity terminal by a downlink network by the virtual management terminal.

The computer program, when run by the processor, causes the processor further to: acquire first reported data of a second entity terminal, convert, by the virtual management terminal, the first reported data into second reported data of the predetermined protocol, send the second reported data to a second virtual terminal corresponding to the second entity terminal, receive the second reported data by the second virtual terminal, convert the second reported data into third reported data of a server protocol, and report the third reported data to the server.

Figure 8:
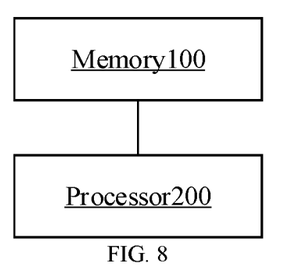
FIG. 8 is a schematic structural diagram of an electronic device in a fourth embodiment of the present disclosure.

A fourth embodiment of the present disclosure provides an electronic device, which can be used as an intermediate conversion device in IoT. The schematic structural diagram is as shown in FIG. 8 and the electronic device at least includes a memory 100 and a processor 200. A computer program is stored on the memory 100, and the processor 200, when running the computer program on the memory, is caused to perform the method according to the first embodiment of the present disclosure. In some embodiments, the method includes processes S301 to S304 as follows.

In S301, a configuration file is acquired.

In S302, a virtual management terminal is configured based on the configuration file, wherein the virtual management terminal is configured to perform conversion between an entity terminal protocol and a predetermined protocol.

In S303, a network access request is received from a first entity terminal, and a first virtual terminal corresponding to the first entity terminal is created based on the network access request, wherein the first virtual terminal is configured to perform conversion between a server protocol and the predetermined protocol.

In S304, network access of the first entity terminal is implemented based on the first virtual terminal.

In some embodiments, the configuration file at least includes: an entity terminal list, and the entity terminal list at least includes entity terminal types; virtual terminal types and a cache configuration of a virtual terminal corresponding to each virtual terminal type.

In response to configuring the virtual management terminal based on the configuration file stored on the memory, the processor, when running the computer program on the memory, is caused to configure, based on the entity terminal list, a communication interface on the virtual management terminal for each of the entity terminals in the list.

In response to receiving the network access request from the first entity terminal, and creating the first virtual terminal corresponding to the first entity terminal based on the network access request stored on the memory, the processor, when running the computer program on the memory, is caused to detect whether the first entity terminal is present in the entity terminal list. In response to the first entity terminal being present in the entity terminal list, determining a virtual terminal type of the first virtual terminal based on the type of the first entity terminal; and creating the first virtual terminal based on the virtual terminal type, and dividing a cache corresponding to the type of the first virtual terminal for the first virtual terminal.

In response to implementing the network access of the first entity terminal based on the first virtual terminal, the processor, when running the computer program on the memory, is caused to: cache terminal status information of the first entity terminal in the cache of the first virtual terminal, wherein the terminal status information is determined based on the network access request, and report an identifier of the first virtual terminal, the virtual terminal type of the first virtual terminal, and the terminal status information of the first entity terminal to the server over an uplink network to complete the network access of the first entity terminal.

The processor, when running the computer program on the memory, is also caused to: receive an updated configuration file delivered by the server; configure the virtual management terminal based on the updated configuration file; create a virtual terminal corresponding to an entity terminal based on a network access application of the entity terminal; and implement network access of the entity terminal based on the virtual terminal.

Meanwhile, the processor 200, when running the computer program on the memory 100, is also caused to perform the method according to the second embodiment of the present disclosure when running the computer program on the memory 100. In some embodiments, the method includes process S401 to S403 as follows.

In S401, an identifier of a target virtual terminal and a target data packet which are delivered by the server is received.

In S402, the target data packet is converted into first delivered data of a predetermined protocol by the target virtual terminal corresponding to the identifier of the target virtual terminal, and caching the first delivered data in a cache of the target virtual terminal.

In S403, the first delivered data from the cache of the target virtual terminal is acquired by the virtual management terminal, and the first delivered data is converted into second delivered data of a target protocol, wherein the target protocol is a protocol of the target entity terminal corresponding to the target virtual terminal.

In S404, the second delivered data is sent to the target entity terminal by a downlink network by the virtual management terminal.

The processor, when running the computer program on the memory, is also caused to: acquire first reported data of a second entity terminal; convert, by the virtual management terminal, the first reported data into second reported data of the predetermined protocol, and send the second reported data to a second virtual terminal corresponding to the second entity terminal; and receive the second reported data by the second virtual terminal, convert the second reported data into third reported data of a server protocol, and report the third reported data to the server.

A plurality of embodiments of the present disclosure have been described in detail above, but the present disclosure is not limited to these exemplary embodiments. Those skilled in the art can make various variations and amendments to the embodiments based on the concept of the present disclosure. These variations and amendments should fall within the scope of protection claimed by the present disclosure.

What is claimed is:

1. A method for networking multi-protocol terminals, comprising:
   acquiring a configuration file;
   configuring, based on the configuration file, a virtual management terminal, wherein the virtual management terminal is configured to perform conversion between an entity terminal protocol and a predetermined protocol;
   receiving a network access request from a first entity terminal, and creating, based on the network access request, a first virtual terminal corresponding to the first entity terminal, wherein the first virtual terminal is configured to perform conversion between a server protocol and the predetermined protocol; and
   implementing, based on the first virtual terminal, network access of the first entity terminal,
   wherein the configuration file at least comprises:
   an entity terminal list, wherein the entity terminal list at least comprises entity terminal types;
   virtual terminal types and a cache configuration of a virtual terminal corresponding to each of the virtual terminal types; and
   a correspondence list between virtual terminals and entity terminals,
   wherein receiving the network access request from the first entity terminal and creating, based on the network access request, the first virtual terminal corresponding to the first entity terminal comprises:
   detecting whether the first entity terminal is present in the entity terminal list;
   determining, in response to the first entity terminal being present in the entity terminal list, a virtual terminal type of the first virtual terminal based on the type of the first entity terminal; and
   creating, based on the virtual terminal type and the correspondence list between the virtual terminals and the entity terminals, the first virtual terminal and dividing a cache corresponding to the type of the first virtual terminal for the first virtual terminal.

2. The method according to claim 1, wherein configuring, based on the configuration file, the virtual management terminal comprises:
   configuring, based on the entity terminal list, a communication interface on the virtual management terminal for each of the entity terminals in the entity terminal list.

3. The method according to claim 1, wherein receiving the network access request from the first entity terminal, and creating, based on the network access request, the first virtual terminal corresponding to the first entity terminal further comprises:
   feeding, in response to the first entity terminal being not present in the entity terminal list, failure information back to the first entity terminal.

4. The method according to claim 1, wherein implementing, based on the first virtual terminal, the network access of the first entity terminal comprises:
   caching terminal status information of the first entity terminal in the cache of the first virtual terminal, wherein the terminal status information is determined based on the network access request; and
   reporting an identifier of the first virtual terminal, the virtual terminal type of the first virtual terminal, and the terminal status information of the first entity terminal to a server over an uplink network, so as to complete the network access of the first entity terminal.

5. The method according to claim 1, further comprising:
   acquiring an updated configuration file;
   configuring, based on the updated configuration file, the virtual management terminal; and
   creating, based on a network access application of an entity terminal, a virtual terminal corresponding to the entity terminal, and implementing, based on the virtual terminal, network access of the entity terminal.

6. A method for communication in multi-protocol networks, comprising:
   receiving an identifier of a target virtual terminal and a target data packet delivered by a server;
   converting, by a target virtual terminal corresponding to the identifier of the target virtual terminal, the target data packet into first delivered data of a predetermined protocol;
   converting, by a virtual management terminal, the first delivered data into second delivered data of a target protocol, wherein the target protocol is a protocol of a target entity terminal corresponding to the target virtual terminal; and
   sending, by the virtual management terminal, the second delivered data to the target entity terminal over a downlink network,
   wherein the target virtual terminal is created based on a network access request from the target entity terminal after a configuration file is acquired,
   wherein the configuration file at least comprises:
   an entity terminal list, wherein the entity terminal list at least comprises entity terminal types;
   virtual terminal types and a cache configuration of a virtual terminal corresponding to each of the virtual terminal types; and
   a correspondence list between virtual terminals and entity terminals,
   wherein the target virtual terminal is created by:
   detecting whether the target entity terminal is present in the entity terminal list;
   determining, in response to the target entity terminal being present in the entity terminal list, a virtual terminal type of the target virtual terminal based on the type of the target entity terminal; and
   creating, based on the virtual terminal type and the correspondence list between the virtual terminals and the entity terminals, the target virtual terminal and dividing a cache corresponding to the type of the target virtual terminal for the target virtual terminal.

7. The method according to claim 6, further comprising:
   caching, upon converting the target data packet into the first delivered data by the target virtual terminal, the first delivered data in a cache of the target virtual terminal by the target virtual terminal; and
   acquiring, prior to converting the first delivered data into the second delivered data by the virtual management terminal, the first delivered data from the cache of the target virtual terminal by the virtual management terminal.

8. The method according to claim 6, further comprising:
   acquiring first reported data of a second entity terminal;

converting, by the virtual management terminal, the first reported data into second reported data of the predetermined protocol, and sending the second reported data to a second virtual terminal corresponding to the second entity terminal; and receiving the second reported data by the second virtual terminal, converting the second reported data into third reported data of a server protocol, and reporting the third reported data to the server.

9. A non-transitory computer storage medium storing a computer program, wherein the computer program, when run by a processor, causes the processor to perform the method as defined in claim 1.

10. A non-transitory computer storage medium storing a computer program, wherein the computer program, when run by a processor, causes the processor to perform the method as defined in claim 6.

11. An electronic device at least comprising a memory and a processor, wherein the memory stories a computer program, and the processor, when running the computer program on the memory, is caused to:

acquire a configuration file;

configure, based on the configuration file, a virtual management terminal, wherein the virtual management terminal is configured to perform conversion between an entity terminal protocol and a predetermined protocol;

receive a network access request from a first entity terminal, and create, based on the network access request, a first virtual terminal corresponding to the first entity terminal, wherein the first virtual terminal is configured to perform conversion between a server protocol and the predetermined protocol; and implement, based on the first virtual terminal, network access of the first entity terminal, wherein the configuration file at least comprises:

an entity terminal list, wherein the entity terminal list at least comprises entity terminal types;

virtual terminal types and a cache configuration of a virtual terminal corresponding to each of the virtual terminal types; and a correspondence list between virtual terminals and entity terminals, wherein the processor, when running the computer program on the memory, is caused to:

detect whether the first entity terminal is present in the entity terminal list;

determine, in response to the first entity terminal being present in the entity terminal list, a virtual terminal type of the first virtual terminal based on the type of the first entity terminal; and create, based on the virtual terminal type and the correspondence list between the virtual terminals and the entity terminals, the first virtual terminal and dividing a cache corresponding to the type of the first virtual terminal for the first virtual terminal.

12. The electronic device according to claim 11, wherein the processor, when running the computer program on the memory, is caused to:

configure, based on the entity terminal list, a communication interface on the virtual management terminal for each of the entity terminals in the entity terminal list.

13. The electronic device according to claim 11, wherein the processor, when running the computer program on the memory, is caused to:

feed, in response to the first entity terminal being not present in the entity terminal list, failure information back to the first entity terminal.

14. The electronic device according to claim 11, wherein the processor, when running the computer program on the memory, is caused to:

cache terminal status information of the first entity terminal in the cache of the first virtual terminal, wherein the terminal status information is determined based on the network access request; and report an identifier of the first virtual terminal, the virtual terminal type of the first virtual terminal, and the terminal status information of the first entity terminal to a server over an uplink network, so as to complete the network access of the first entity terminal.

15. The electronic device according to claim 11, wherein the processor, when running the computer program on the memory, is caused to:

acquire an updated configuration file;

configure, based on the updated configuration file, the virtual management terminal; and create, based on a network access application of an entity terminal, a virtual terminal corresponding to the entity terminal, and implementing, based on the virtual terminal, network access of the entity terminal.

16. An electronic device at least comprising a memory and a processor, wherein a computer program is stored on the memory, and the processor, when running the computer program on the memory, is caused to perform the method as defined in claim 6.

* * * * *